United States Patent [19]
Okada et al.

[11] Patent Number: 5,645,786
[45] Date of Patent: Jul. 8, 1997

[54] METHOD OF MANUFACTURING A MULTILAYER MOLDING

[75] Inventors: Haruo Okada; Hidemi Aoki; Yasuhiko Takeuchi; Kunio Yuhara, all of Hanishina-gun, Japan

[73] Assignee: Nissei Plastic Industrial Co., Ltd., Nagano-ken, Japan

[21] Appl. No.: 677,193

[22] Filed: Jul. 9, 1996

Related U.S. Application Data

[63] Continuation of Ser. No. 343,258, Nov. 22, 1994, abandoned.

[30] Foreign Application Priority Data

Dec. 20, 1993 [JP] Japan .................. 5-345054

[51] Int. Cl.[6] .................................. B29C 45/16
[52] U.S. Cl. ............ 264/255; 264/328.12; 264/DIG. 57
[58] Field of Search ................... 264/255, 328.8, 264/328.12, 510, 45.1, 46.6, DIG. 57, 513

[56] References Cited

U.S. PATENT DOCUMENTS

| | | | |
|---|---|---|---|
| 3,894,823 | 7/1975 | Hanning | 264/328.12 |
| 3,906,066 | 9/1975 | Barrie | 264/328.12 |
| 4,014,966 | 3/1977 | Hanning | 264/328.12 |
| 4,035,466 | 7/1977 | Langecker | 264/255 |
| 4,174,413 | 11/1979 | Yasuike et al. | 264/328.12 |
| 4,459,257 | 7/1984 | Baciu | 264/255 |
| 4,701,292 | 10/1987 | Valyi | 264/255 |
| 4,774,047 | 9/1988 | Nakamura et al. | 264/255 |
| 5,093,054 | 3/1992 | Hirota | 264/45.1 |
| 5,125,817 | 6/1992 | Yamachika | 425/130 |
| 5,141,695 | 8/1992 | Nakamura | 264/255 |
| 5,167,896 | 12/1992 | Hirota et al. | 264/255 |

FOREIGN PATENT DOCUMENTS 4916539 4/1974 Japan .

*Primary Examiner*—Angela Ortiz
*Attorney, Agent, or Firm*—Weingarten, Schurgin, Gagnebin & Hayes LLP

[57] ABSTRACT

An improved method of manufacturing a multilayer molding having a core and a surface layer by means of a double nozzle structure can eliminate a damaging phenomenon of producing a mixture of a resin material for forming the core remaining in and out of the aperture of the inner nozzle of the double nozzle structure and a resin material for forming the surface layer in the initial stages of molding operation by effectively driving back the remaining resin into the inner nozzle. A double nozzle structure that can suitably be used with such a method includes a shut-off pin arranged in the inner nozzle disposed at the center of the outer nozzle. The resin material for forming the core is driven out simultaneously with the resin material for forming the surface layer coming from the outer nozzle. The operation of resin injection from the inner nozzle is terminated at an arbitrarily selected moment during the operation of injecting the resin material for the surface layer of the outer nozzle. Then, the inside of the inner nozzle is brought into a no-load condition while the shut-off pin is held to its open position. Thereafter, the remaining resin material for the core found in and out of the aperture of the inner nozzle is driven back into the inner nozzle by the pressure of the resin injected from the outer nozzle. Finally, the inner nozzle is closed by the shut-off pin and the injecting operation of the outer nozzle is terminated.

1 Claim, 2 Drawing Sheets

METHOD OF MANUFACTURING A MULTILAYER MOLDING

This application is a continuation of application Ser. No. 08/343,258, filed Nov. 22, 1994, now abandoned.

BACKGROUND OF THE INVENTION

1. Field of the Invention

This invention relates to a method of manufacturing a molding having a core and a surface layer and showing a multilayered cross section by means of a double nozzle structure comprising an inner nozzle and an outer nozzle.

2. Background Art

A method of manufacturing a molding having a core and a surface layer and showing a multilayered cross section by means of a double nozzle structure comprising an inner nozzle for injecting a resin material to form the core of the molding and an outer nozzle for simultaneously injecting another resin material to form the surface layer of the molding is already well known. With such a double nozzle structure for manufacturing a multilayered molding, if the operation of resin injection is suspended simultaneously at the two nozzles, the resin material for forming the core partly remains in and out of the aperture of the inner nozzle. When the operation is resumed, the remaining resin becomes mixed with the resin material running through the outer nozzle for forming the surface layer so that, as schematically illustrated in FIG. 4 of the accompanying drawings, the resultant surface layer is made of a mixture of the resin material 2 for the surface layer and the resin material 3 for the core in areas near the gate of the injection molding system thereby failing to produce a multilayer molding.

Japanese Patent Application Laid-Open Publication No. Show 49-16539 discloses a method of manufacturing a double colored molding that can improve such a damaging phenomenon by reducing the pressure being applied to the inner nozzle when the injecting operation is suspended in order to cause the resin remaining outside the inner nozzle to be driven back into it by the pressure being applied to the outer nozzle.

[Problems to be Solved by the Invention]

However, with the above improved method of manufacturing a multilayer molding, the resin material for forming the core can readily flow out of the inner nozzle while it is being volumetrically measured for another injecting operation so that the resin to be injected from the inner nozzle cannot be measured when resin is being injected from the outer nozzle under pressure in order to maintain the inner pressure of the double nozzle structure. Additionally, if a foaming resin material is used for the core, measures need to be taken to prevent adverse effects of the pressure of the resin foam injected into the mold cavity on the resin remaining in the nozzles.

While these problems are solved by providing the inner nozzle with a shut-off pin, since the shut-off pin is so designed as to close the aperture of the nozzle the instant that the injecting operation is suspended to shut off the aperture of the nozzle and the inside of the nozzle, it cannot be feasibly used with the above described improved method of causing the resin remaining outside the inner nozzle to be driven back into it by utilizing the pressure difference between the inner and outer nozzles.

With a proposed technique, the operation of resin injection for each molding is terminated at a timing earlier than that of the common practice to make the amount of resin driven out of the outer nozzle for each molding somewhat excessive relative to the corresponding amount injected from the inner nozzle so that the excessive resin can be flushed to clear the inner nozzle. However, with this proposed technique, the core of the produced molding can contain to certain extent the resin material for the surface layer, which may produce shrinkage and other defects on the product and the product can put on an excessive weight. Additionally, if waste plastic is used for the core, this does not provide a recommendable way to effectively consume waste plastic because the mold is filled with less waste plastic.

In view of the above circumstances, it is therefore an object of the present invention to provide a method of manufacturing a multilayer molding that eliminates any adverse effects of the resin material for forming the core of the molding remaining in the inner nozzle in order to make the molding flawless even in areas near the gate of the molding system if the inner nozzle of the molding system is provided with a shut-off pin.

SUMMARY OF THE INVENTION

According to the invention, the above object is achieved by providing a method of manufacturing a molding having a core and a surface layer and showing a multilayered cross section by means of a double nozzle structure comprising an outer nozzle for injecting a resin material for the surface layer of the molding, an inner nozzle disposed at the center of said outer nozzle for injecting another resin material for the core of the molding covered by the surface layer and a shut-off pin arranged in the inner nozzle, terminating the operation of injecting the resin material for the core of the inner nozzle during the operation of injecting the resin material for the surface layer of the outer nozzle to produce a no-load condition in the inner nozzle while the shut-off pin is held open so that the resin material for the core remaining in and out of the aperture of the inner nozzle is driven back into the inner nozzle by the pressure of the resin material coming out of the outer nozzle and the operation of injecting the resin material of the outer nozzle is terminated after closing the inner nozzle with the shutoff pin.

With the above described method, since a no-load condition is produced in the inner nozzle and, at the same time, any resin material remaining in and out of the aperture of the inner nozzle is driven back into the inner nozzle by the pressure of the resin material coming out of the outer nozzle until the inside of the aperture of the inner nozzle is filled with the resin material for the surface layer, the resin material for forming the core coming out of the inner nozzle is always injected inside the resin material for forming the surface layer coming out of the outer nozzle if the inner and outer nozzles are operated simultaneously for resin injection. Thus, the resin material for forming the core is held at the center of the resin material for forming the surface layer even when they are coming out of the nozzles and driven into the cavity of the mold under that condition through the nozzle apertures and the sprue of the injection molding system without causing the two resin materials to be mixed with each other in the initial stages of the injection molding operation. The net result is a multilayer molding having a surface layer free from the resin material of the core.

Now, the present invention will be described in greater detail in terms of a best mode of carrying out the invention by referring to FIGS. 1 through 3 of the accompanying drawings.

DETAILED DESCRIPTION OF THE PREFERRED EMBODIMENTS

In the mode of carrying out the invention as described below, a foaming resin material is used for the core of a multilayer molding having a core and a surface layer to be manufactured by a method according to the invention.

Figure 1:
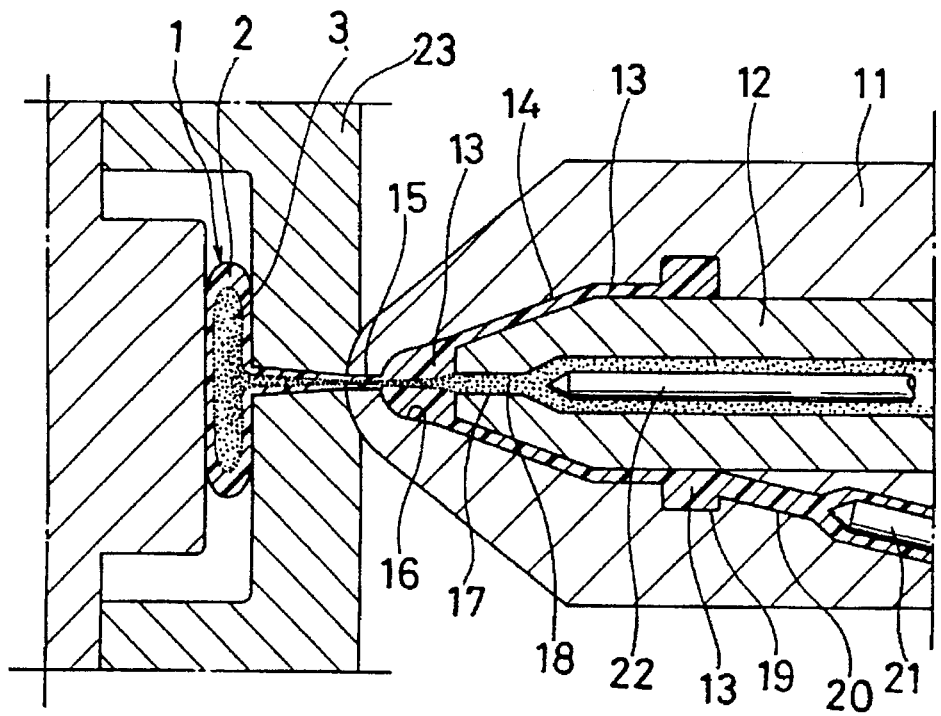
FIG. 1 is a schematic sectional view of a double nozzle structure, injecting simultaneously a resin material for forming a surface layer and a resin material for forming a core into the cavity of a mold, the latter resin material being a foaming resin according to one of embodiments of the present invention.
Figure 2:
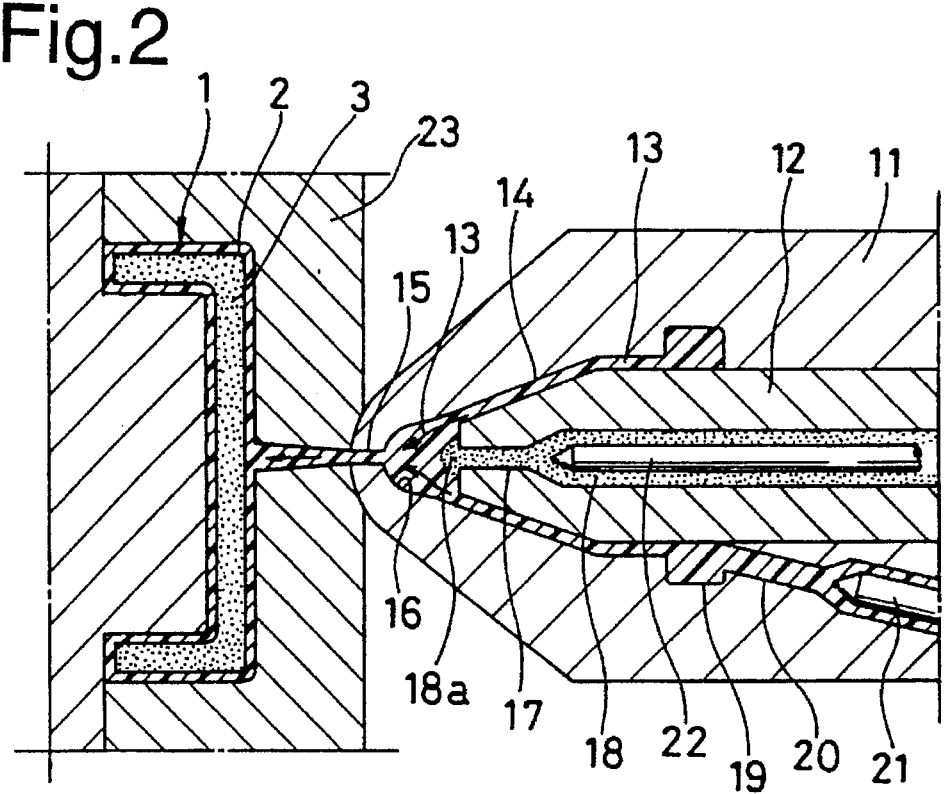
FIG. 2 is a schematic sectional view similar to FIG. 1 but showing a condition where the operation of injecting the foaming resin material from the inner nozzle is suspended.
Figure 3:
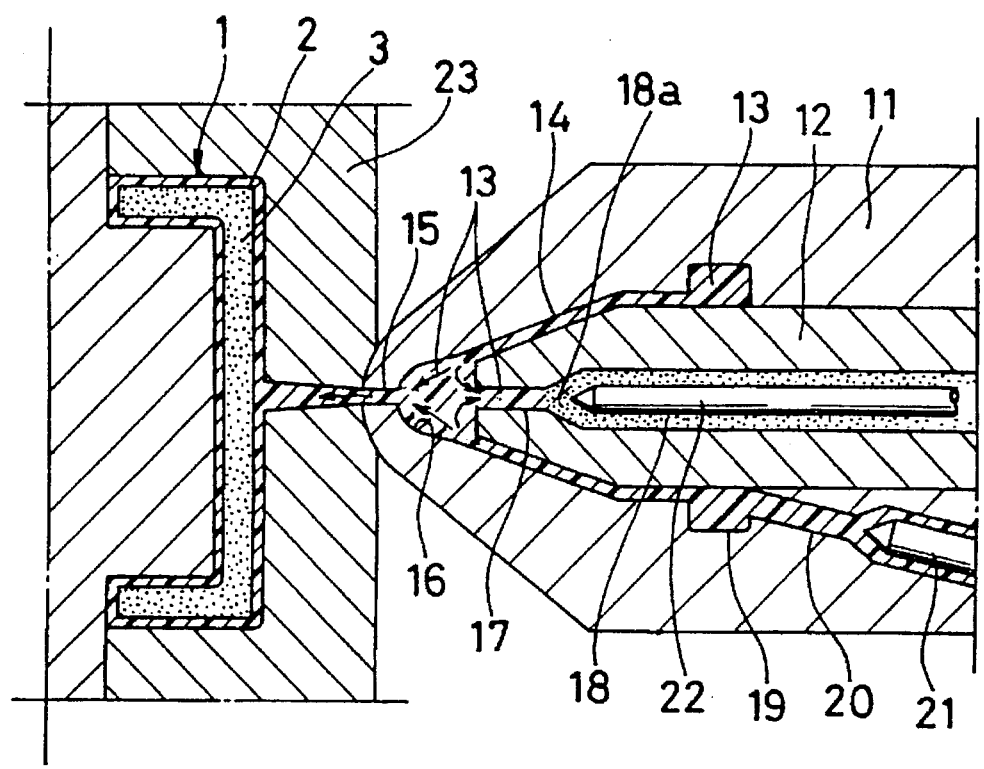
FIG. 3 is a schematic sectional view similar to FIG. 1 but showing a condition where the foaming resin material is flushed out of the inside of the aperture of the inner nozzle by a method according to the invention.
Figure 4:
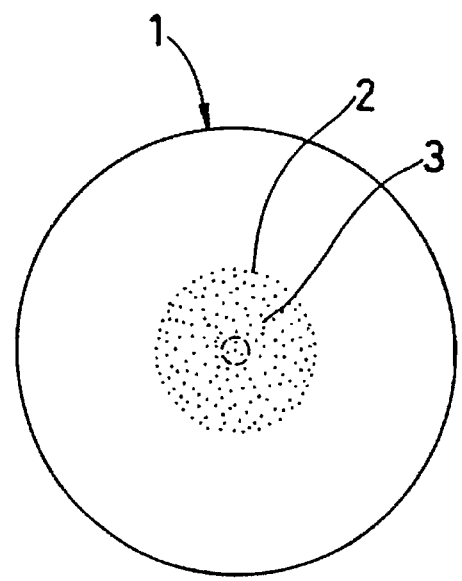
FIG. 4 is a schematic view of a multilayer molding showing that the resin material of its core is partly surfaced by a conventional method.

Referring to FIGS. 1 through 3, where same components are respectively denoted by same reference symbols, they show a double nozzle structure comprising an outer nozzle 11, a coaxial inner nozzle 12 arranged inside the outer nozzle 11 and a pathway 14 for a resin material 13 for forming the surface layer 2 of a molding 1. The section connecting the resin pathway 14 and an aperture 15 at the front end of the outer nozzle 11 provides a resin reservoir 16 disposed right in front of an aperture 17 of the inner nozzle 12. With such an arrangement, a foaming resin material 18 for forming the core 3 of the molding 1 can be driven out of the nozzle aperture 17 simultaneously with the operation of injecting the resin material 13.

Said pathway 14 for the resin material 13 is linked at the rear end thereof with an annular groove 19, which is by turn connected to an inclined pathway 20. Said inclined pathway 20 and the inner nozzle 12 are provided in the inside thereof with respective axially movable and axially extending shut-off pins 21 and 22. When the operation of injecting the resin materials into the cavity of a metal mold 23 to produce a molding, the rear end of the resin pathway 14 and that of the aperture 17 of the inner nozzle 12 are airtightly closed by the respective shut-off pins 21 and 22.

For manufacturing a multilayer molding 1 by injection molding by means of a double nozzle structure having a configuration as described above, the shut-off pin 21 is moved to its open position to allow the resin material 13 for forming the surface layer to be injected into the cavity through the outer nozzle 11. When a predetermined amount of the resin material 13 for the surface layer has been injected, the shut-off pin 22 is shifted to its open position to allow the foaming resin material 18 to be injected into the cavity by way of the inner nozzle 12, the aperture 17 and the center of the resin material 13 in the resin reservoir 16.

Thus, the foaming resin material 18 is already surrounded by the resin material 13 for the surface layer to form a core when it is driven into the resin reservoir 16 and then driven further into the cavity of the metal mold 23 with the resin material 13 for the surface layer by way of the nozzle aperture 15 and the sprue of the metal mold 23 as shown in FIG. 1.

When the duration of time specifically set for the operation of simultaneous injection is over, the inner nozzle stops injecting the foaming resin material 18. The timing for terminating the operation of the inner nozzle 12 can be arbitrarily selected relative to the injecting operation of the outer nozzle 11 and, the instant that the inner nozzle 12 stops injecting resin, it is brought into a no-load condition with the shut-off pin 22 held to its open position (by controlling the pressure of the resin drive piston).

Now, since there is no further supply of the foaming resin material 18 after the termination of the injecting operation, substantially all the foaming resin material 18 remaining in the resin reservoir 16 is flushed by the resin material 13 for the surface layer coming from the outer nozzle 11 and runs into the cavity, although a small amount of foaming resin material 18 may remain in and out of the nozzle aperture 17. The remaining foaming resin material 18a can flow into resin reservoir 16 and become mixed with the resin material 13 for the surface layer in the resin reservoir 16 before the next cycle of molding operation starts to produce a defective molding.

However, with the above described method according to the invention, the resin material 13 for the surface layer partly flows into the inner nozzle because of the pressure difference that is given rise to when the inner nozzle 12 is brought into a no-load condition so that the remaining foaming resin material 18a is pushed back into the inner nozzle 12 by the resin material 13 for the surface layer and consequently cleared away from in and out of the nozzle aperture and the nozzle aperture 17 is totally filled with the resin material 13 for the surface layer as shown in FIG. 3. Since the time required for flushing the remaining foaming resin material 18a is very short, the operation of injecting the resin material 13 for the surface layer can be terminated shortly after the end of the operation of injecting the foaming resin material 18.

After the remaining foaming resin material 18a is cleared away, the shut-off pin 22 is shifted to its closed position to block the inner nozzle 12, while the shut-off pin 21 of the outer nozzle 11 is held to its open position to maintain the inner pressure of the double nozzle structure. After the step of securing a desired pressure in the double nozzle structure, the next cycle of injection molding operation is started with a volumetric measuring step.

Advantages of the Invention

As described above in detail, with a method of manufacturing a multilayer molding by means of a double nozzle structure according to the invention, the resin material for forming the core of the molding that may remain in and out of the aperture of the inner nozzle is flushed and cleared to prevent any possible mixing of the resin material for the surface layer and the resin material for the core from occurring in the initial stages of the molding cycle.

Additionally, since only a small amount of resin is used for flushing the resin material remaining in and out of the aperture of the inner nozzle, the resin material for the surface layer used for flushing the remaining resin material can hardly enter the inner nozzle and then the core of the next molding so that shrink, an excessive weight and other possible defects can be effectively prevented from occurring on the next molding.

Still additionally, waste plastic can be used with a method of manufacturing a multilayer molding according to the invention at a desired consumption rate. If foaming resin is used for the core, any possible adverse effects of the use of a foaming agent an be minimized to produce a massive multilayer molding with fine appearance.

What is claimed is:

1. A method of manufacturing a molding having an inner core surrounded by an outer layer using a double nozzle structure, said method comprising the steps of:

providing an outer nozzle for injecting a first resin material to form the outer layer of the molding, providing an inner nozzle disposed within said outer nozzle for injecting a second resin material to form the core surrounded by the outer layer, providing a shut-off pin disposed in the inner nozzle to independently control resin flow through said inner nozzle, injecting the first resin material from the outer nozzle into a mold, concurrently injecting the second resin material from an aperture of the inner nozzle into the mold, wherein said shut-off pin is positioned to permit resin flow through said inner nozzle, terminating the step of injecting the second resin material to produce a low pressure condition in the inner nozzle, allowing the second resin material proximate the aperture of the inner nozzle to be driven back into the inner nozzle by the pressure of the first resin material, positioning the shut-off pin to independently stop resin flow back into said inner nozzle, and terminating the step of injecting the first resin material from the outer nozzle.

* * * * *